United States Patent
Kataria et al.

(10) Patent No.: US 11,170,077 B2
(45) Date of Patent: Nov. 9, 2021

(54) VALIDATING THE INTEGRITY OF APPLICATION DATA USING SECURE HARDWARE ENCLAVES

(71) Applicant: VMWARE, INC., Palo Alto, CA (US)

(72) Inventors: Alok Nemchand Kataria, Pune (IN); Achindra Bhatnagar, Hyderabad (IN); Sachin Shinde, Pune (IN); Martim Carbone, Palo Alto, CA (US); Deep Shah, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 327 days.

(21) Appl. No.: 16/296,273

(22) Filed: Mar. 8, 2019

(65) Prior Publication Data

US 2020/0218792 A1 Jul. 9, 2020

(30) Foreign Application Priority Data

Jan. 4, 2019 (IN) .............................. 201941000471

(51) Int. Cl.
*G06F 21/12* (2013.01)
*G06F 21/60* (2013.01)
(Continued)

(52) U.S. Cl.
CPC .......... *G06F 21/123* (2013.01); *G06F 21/602* (2013.01); *G06F 21/6281* (2013.01); *G06F 21/64* (2013.01); *H04L 9/3236* (2013.01)

(58) Field of Classification Search
CPC ...... G06F 21/64; G06F 21/123; G06F 21/602; G06F 21/6281; H04L 9/3236
See application file for complete search history.

(56) References Cited

U.S. PATENT DOCUMENTS

| | | | |
|---|---|---|---|
| 9,531,689 B1* | 12/2016 | Romero-Mariona | ....................... G06F 21/602 |
| 2010/0082984 A1* | 4/2010 | Ellison | .................. H04L 9/3236 713/170 |

(Continued)

OTHER PUBLICATIONS

Pieter Maene • Johannes Gotzfried • Ruan de Clercq • Tilo Muller • Felix Freiling • Ingrid Verbauwhede; Hardware-Based Trusted Computing Architectures for Isolation and Attestation; IEEE Transactions on Computers (vol. 67, Issue: 3, pp. 361-374); (Year: 2018).*

(Continued)

*Primary Examiner* — Luu T Pham
*Assistant Examiner* — Chao Wang

(57) ABSTRACT

Techniques for verifying the integrity of application data using secure hardware enclaves are provided. In one set of embodiments, a client system can create a secure hardware enclave on the client system and load program code for an integrity verifier into the secure hardware enclave. The client system can further receive a dataset from a server system and store the dataset at a local storage or memory location, and receive, via the integrity verifier, a cryptographic hash of the dataset from the server system and store the received cryptographic hash at a memory location within the secure hardware enclave. Then, on a periodic basis, the integrity verifier can compute a cryptographic hash of the stored dataset, compare the computed cryptographic hash against the stored cryptographic hash, and if the computed cryptographic hash does not match the stored cryptographic hash, determine that the stored dataset has been modified.

18 Claims, 4 Drawing Sheets

(51) Int. Cl.
*H04L 9/32* (2006.01)
*G06F 21/64* (2013.01)
*G06F 21/62* (2013.01)

(56) References Cited

U.S. PATENT DOCUMENTS

2016/0197949 A1* 7/2016 Nyhuis ............... H04L 63/0428
713/190
2019/0147188 A1* 5/2019 Benaloh ................ H04L 9/0897
726/26
2020/0228318 A1* 7/2020 Karame ............... H04L 9/3297

OTHER PUBLICATIONS

Le Guan • Chen Cao • Peng Liu • Xinyu Xing • Xinyang Ge • Shengzhi Zhang • Meng Yu • Trent Jaeger; Building a Trustworthy Execution Environment to Defeat Exploits from both Cyber Space and Physical Space for ARM; IEEE Transactions on Dependable and Secure Computing; (Year: 2019).*

Sun, Haonan • He, Rongyu • Zhang, Yong • Wang, Ruiyun • Ip, Wai Hung • Yung, Kai Leung; eTPM: A Trusted Cloud Platform Enclave TPM Scheme Based on Intel SGX Technology; Sensors (Basel, Switzerland), 18(11), 3807; (Year: 2018).*

* cited by examiner

VALIDATING THE INTEGRITY OF APPLICATION DATA USING SECURE HARDWARE ENCLAVES

RELATED APPLICATIONS

Benefit is claimed under 35 U.S.C. 119(a)-(d) to Foreign Application Serial No. 201941000471 filed in India entitled "VALIDATING THE INTEGRITY OF APPLICATION DATA USING SECURE HARDWARE ENCLAVES", on Jan. 4, 2019, by VMware, Inc., which is herein incorporated in its entirety by reference for all purposes.

BACKGROUND

Many software applications maintain and/or make use of data that needs to be safeguarded against tampering in order to ensure that the applications work as intended. For example, anti-virus, anti-malware, and other similar security-oriented applications maintain sensitive datasets such as virus definitions, security policies, and so on that are critical to their security functions. If these sensitive datasets are altered by an attacker, the security provided by the applications can be negated, thereby rendering the applications useless.

DETAILED DESCRIPTION

Figure 1:
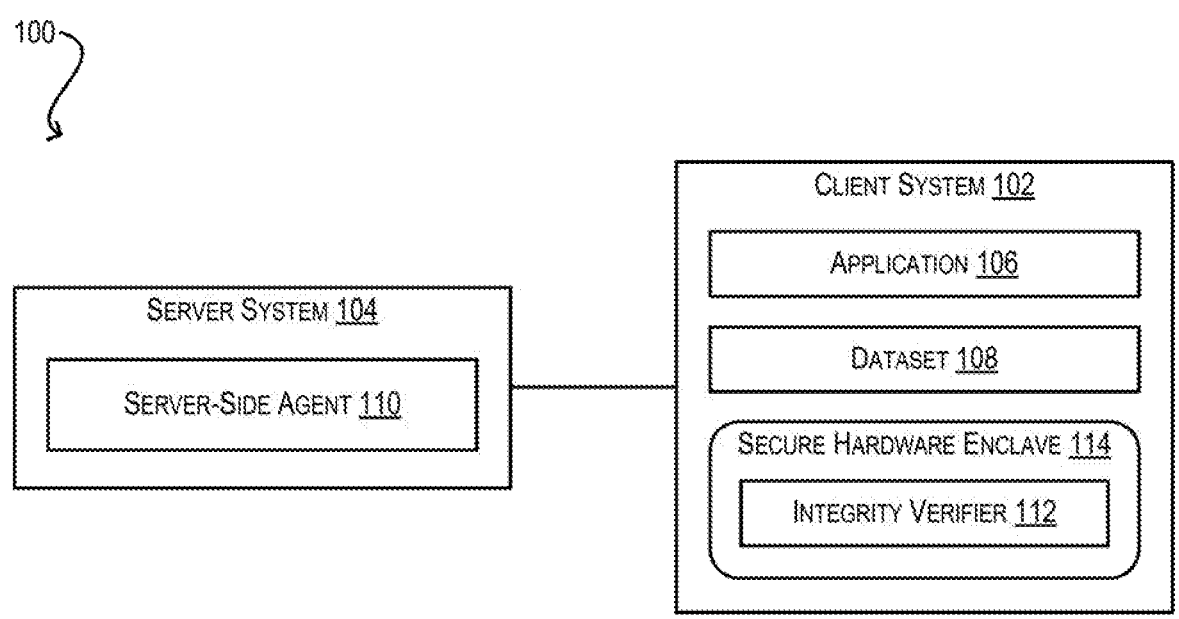
FIG. 1 depicts a system environment that implements the techniques of the present disclosure.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for validating the integrity of application data through the use of secure hardware enclaves. As used herein, a "secure hardware enclave" (also known as a "hardware-assisted trusted execution environment (TEE)") is a region of computer system memory, allocated via a special set of central processing unit (CPU) instruction codes, where user-world code can run in a manner that is isolated from other processes running in other memory regions (including those running at higher privilege levels). Thus, secure hardware enclaves enable secure and confidential computation. Examples of existing technologies that facilitate the creation and use of secure hardware enclaves include SGX (Software Guard Extensions) for x86-based CPUs and TrustZone for ARM-based CPUs.

At a high level, the techniques of the present disclosure involve creating a secure hardware enclave on a client system, loading into the enclave a user-world agent (referred to as an "integrity verifier"), and receiving at the client system from a server system (1) an application dataset to be monitored by the integrity verifier and (2) a cryptographic hash of the dataset. The application dataset can be received and stored outside of the secure hardware enclave (such as by the application associated with the dataset), while the cryptographic hash can be received and maintained by the integrity verifier within the secure hardware enclave. Then, on a random periodic basis, the integrity verifier can read the application dataset, re-compute the dataset's cryptographic hash, and verify the computed hash against the hash received from the server system. If a mismatch is detected, the integrity verifier can conclude that the dataset has been altered and can alert the server system and/or take some other remedial action.

Since the integrity verifier runs within the secure hardware enclave, there is no way for a malicious entity to modify or subvert its operation. Accordingly, the hash computation and hash verification that the integrity verifier performs can be trusted as being accurate. In certain embodiments, the server system can carry out a remote attestation procedure prior to provisioning the application dataset and cryptographic hash to the client system, which enables the server system to verify that (A) the created client-side enclave is a true secure hardware enclave, and (B) the correct integrity verifier code has indeed been loaded into that enclave.

In addition, since the integrity verifier performs its hash computation and hash verification at random intervals, it is exceedingly difficult for an attacker to find a time window in which he/she can tamper with the application dataset without being detected. In some embodiments, to further strengthen the security of this solution, the integrity verifier can store a CPU-generated timestamp value each time the hash computation/verification is performed (thereby recording the time of the last verification) and provide this timestamp value to the server system on a regular basis (e.g., every X seconds). The server system can monitor this value in order to ensure that the integrity verifier is making forward progress and hasn't been blocked by a denial-of-service (DoS) or other similar attack.

The foregoing and other aspects of the present disclosure are described in further detail below.

2. System Environment

FIG. 1 is a simplified block diagram of a system environment 100 that implements the techniques of the present disclosure. As shown, system environment 100 includes a client system 102 that is communicatively coupled with a server system 104. Client system 102 and server system 104 can each be implemented using a physical computing system/device or a virtual machine (VM). Client system 102 runs a software application 106, which is configured to maintain on client system 102 an application dataset 108 that is provisioned by a server-side agent 110 of server system 104. It is assumed that dataset 108 comprises sensitive data that systems 102/104 and/or application 106 would like to protect against tampering by a third-party. For example, in a particular embodiment, application 106 may be a security-oriented application and dataset 108 may comprise policies, definitions, and/or the like needed by application 106 in order to carry out its security functions.

There are a number of conventional ways in which client system 102 can attempt to safeguard the integrity of dataset 108, including methods for detecting modifications to dataset 108 and methods for detecting potential attack vectors (e.g., malware, viruses, etc.). However, all of these methods are vulnerable in the sense that the program code used to implement them can be subverted, assuming an attacker is able to gain system-level access. For example, while client system 102 may implement a process to monitor for unauthorized changes to dataset 108, if an attacker gains control of the operating system (OS) or hypervisor of client system 102, the attacker can use its system-level control to alter the behavior of the process or simply prevent it from running.

To address this general issue, client system 102 of FIG. 1 is configured to leverage the concept of secure hardware enclaves to perform data integrity verification. As mentioned previously, a secure hardware enclave is a region of computer system memory in which user-mode code can run in a manner that is protected and isolated from other user-mode (i.e., application level) as well as kernel-mode (i.e., OS/hypervisor level) processes.

In particular, as shown in FIG. 1, client system 102 can load and run a user-world integrity verifier component 112 within a secure hardware enclave 114 on system 102. Once initiated, integrity verifier 112 can, in conjunction with server-side agent 110, carry out a process for verifying the integrity of dataset 108 on a continuous basis. Because integrity verifier 112 executes entirely within secure hardware enclave 114, it cannot be manipulated by other program code and thus can be trusted. Workflows for implementing this overall solution (including certain enhancements for detecting DoS attacks and efficiently handling updates to dataset 108) are detailed in the sections that follow.

It should be appreciated that system environment 100 of FIG. 1 is illustrative and not intended to limit embodiments of the present disclosure. For example, although FIG. 1 depicts a particular arrangement of entities, other arrangements and configurations are possible. Further, the various entities in FIG. 1 may include subcomponents or functions that are not specifically described. One of ordinary skill in the art will recognize other variations, modifications, and alternatives.

3. High-Level Workflow

Figure 2:
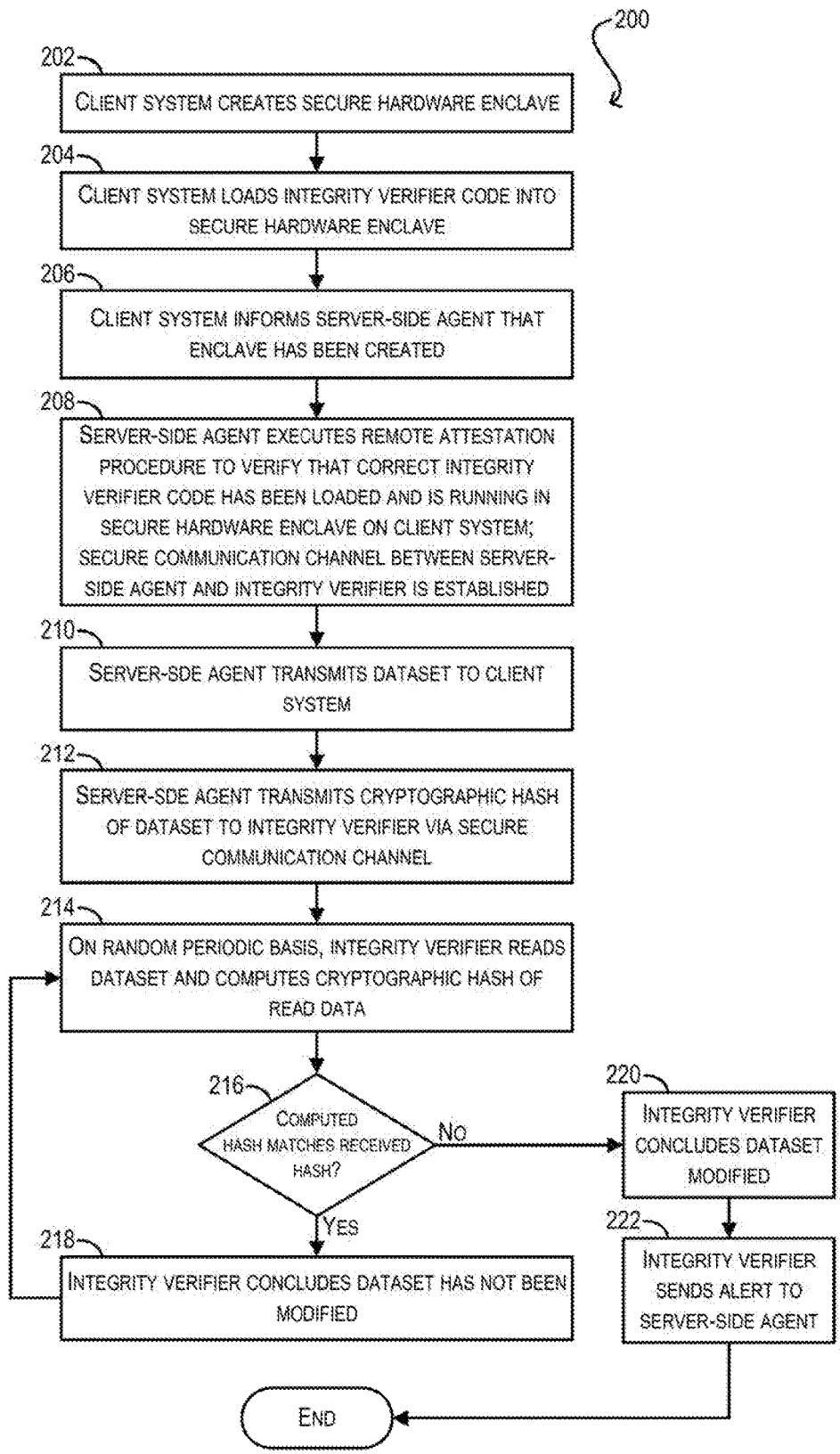
FIG. 2 depicts a high-level workflow for validating the integrity of application data using a secure hardware enclave according to an embodiment.

FIG. 2 depicts a high-level workflow 200 that may be performed within system environment 100 of FIG. 1 for verifying the integrity of dataset 108 using secure hardware enclave 114 according to an embodiment.

Starting with blocks 202 and 204, a component of client system 102 (such as, e.g., application 106) can create/instantiate secure hardware enclave 114 on the system and load the program code for integrity verifier 112 into enclave 114. The particular method used to perform blocks 202 and 204 will differ depending on the enclave's type (e.g., SGX, TrustZone, etc.), but in general this process entails invoking one or more special CPU instruction codes that are provided by the CPU architecture of client system 102 to enable enclave creation. The result of blocks 202 and 204 is the allocation of a protected region of memory (e.g., RAM) on client system 102 which corresponds to secure hardware enclave 114 and the loading of the program code of integrity verifier 112 in this protected memory region.

At blocks 206 and 208, the component of client system 102 can inform server-side agent 110 that secure hardware enclave 114 has been created and, in response, agent 110 can execute a remote attestation procedure with respect to enclave 114. This remote attestation procedure enables server-side agent 110 to verify that (A) enclave 114 is a "true" secure hardware enclave (i.e., an enclave created via the special set of CPU instruction codes exposed for this specific purpose by client system 102's CPU(s)), and (B) the correct program code for integrity verifier 112 has indeed been loaded into, and is actually running within, the created secure hardware enclave. Thus, with step 208, server-side agent 110 can rule out the possibility that an attacker running malicious code is attempting to masquerade as client system 102/integrity verifier 112.

Like enclave creation/loading, the particular method for performing remote attestation will vary depending on enclave type/CPU architecture and thus as is not detailed here. For example, Intel provides one method of remote attestation that is specific to SGX enclaves on x86-based CPUs. One detail worth noting is that, as part of the remote attestation procedure, a secure communication channel (e.g., Transport Layer Security (TLS) session) will be established between server-side agent 110 and integrity verifier 112, and this secure channel will be used for all subsequent communication between these two entities.

Upon successful completion of the remote attestation procedure, server-side agent 110 can transmit dataset 108 to client system 102, thereby provisioning this data to system 102/application 106 (block 210). In addition, at block 212, server-side agent 110 can transmit a cryptographic hash of dataset 108 to integrity verifier 112 via the previously-established secure communication channel. In response, client system 102 can receive and store dataset 108 at a local memory/storage location, and integrity verifier 112 can receive and store the cryptographic hash at a memory location in secure hardware enclave 114 (not shown). In one set of embodiments, dataset 108 can be stored at a memory/storage location outside of secure hardware enclave 114, which enables dataset 108 to be accessed by non-enclave processes like application 106 and allows dataset 108 to be larger in size than the capacity of enclave 114. In other embodiments, dataset 108 can be stored within secure hardware enclave 114.

Once dataset 108 and its cryptographic hash have been received and stored on client system 102, integrity verifier 112 can enter a loop that runs continuously while integrity verification of dataset 108 is needed/desired. Within this loop, on a random periodic basis, integrity verifier 112 can read the content of dataset 108 as stored on client system 102 and compute a cryptographic hash of the read content (using the same hash function employed by server system 104) (block 214). Integrity verifier 112 can then compare the cryptographic hash computed at block 214 with the cryptographic hash received from server-side agent 110 at block 212 and stored within enclave 114 (block 216).

If the two hashes match at block 216, integrity verifier 112 can conclude that dataset 108 (as stored on client system 102) has not been modified (block 218) and can return to block 214. As noted above, integrity verifier 112 can repeat blocks 214-218 on a random periodic basis, such each iteration is performed after some randomly-determined time interval.

On the other hand, if the two hashes do not match at block 216, integrity verifier 112 can conclude that dataset 108 (as stored on client system 102) has been modified/tampered with (block 220) and send an alert to server-side agent 110 (and/or take some other action) (block 222). Integrity verifier 112 can then exit out of the loop and workflow 200 can end.

It should be appreciated that workflow 200 is illustrative and various modifications are possible. For example, although workflow 200 indicates that server-side agent 110 performs the dual functions of (1) remotely attesting integrity verifier 112 and (2) provisioning dataset 108 and its cryptographic hash to client system 102/integrity verifier 112, in some embodiments function (1) may be executed by a third-party, such as an independent remote attestation service. In addition, in certain embodiments the sequencing of one or more blocks in workflow 200 may be changed without affecting the overall outcome of the workflow.

4. Detecting DoS Attacks

One limitation with high-level workflow 200 of FIG. 2 is that it assumes the OS/hypervisor of client system 102 will schedule execution of integrity verifier 112 on the CPU(s) of the system in a fair/normal manner. However, if an attacker gains control of the OS/hypervisor, the attacker may purposefully deny scheduling of the integrity verifier process, which will prevent integrity verifier 112 from carrying out its hash computation and hash verification.

Figure 3:
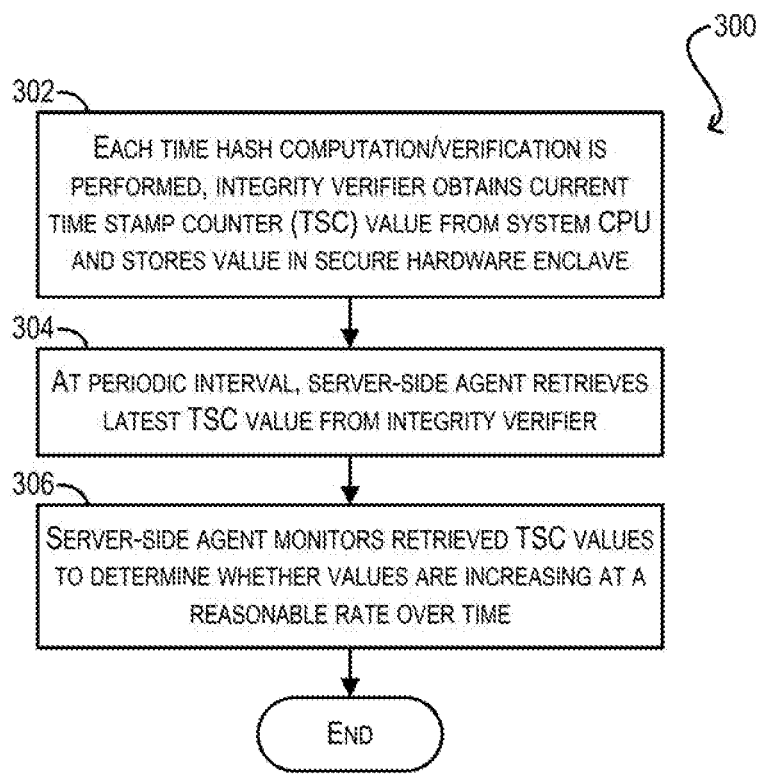
FIG. 3 depicts a workflow that can be used in conjunction with the workflow of FIG. 2 for detecting Denial-of-Service (DoS) attacks against the integrity verifier according to an embodiment.

To address this, FIG. 3 depicts an additional workflow 300 that may be executed in parallel with workflow 200 according to an embodiment. At a high level, workflow 300 leverages CPU-generated timestamps to enable server-side agent 110 to verify whether integrity verifier 112 is running/making forward progress over time. Thus, workflow 300 facilitates the detection of DoS attacks that may be perpetrated against integrity verifier 112.

Starting with block 302, each time integrity verifier 112 completes the hash comparison/verification process that it performs within the loop of workflow 200, integrity verifier 112 can obtain a current time stamp counter (TSC) value generated by a CPU of client system 102 and store this value within secure hardware enclave 114. In the case of x86-based CPUs, the TSC value is obtained by invoking the RDTSC instruction. Since the TSC value is generated directly by the system hardware and is obtained within enclave 114, there is no way for a malicious entity to tamper with it.

At block 304, server-side agent 110 can retrieve (or integrity verifier 112 can push) the latest TSC value recorded within secure hardware enclave 114 via the secure communication channel. Server-side agent 110 can perform this retrieval on a periodic interval, such as once every 5 seconds.

Finally, at block 306, server-side agent 110 can monitor the TSC values retrieved via block 304 to determine whether the values are increasing at a reasonable rate over time. If the TSC values stop increasing at some point for an extended time period, server-side agent 110 can conclude that integrity verifier 112 has been blocked from running and can take an appropriate action, such as alert an administrator or user of client system 102.

5. Handling Data Updates

In some scenarios, once dataset 108 has been provisioned to client system 102, server-side agent 110 may need to update the content of the dataset during the runtime of client system 102. For example, an application upgrade or patch may be rolled-out for application 106 that includes changes to dataset 108. One way to handle this type of data update is to terminate all client-side processes/threads reading dataset 108, provision the updated version of the dataset to client system 102, and then restart the terminated processes/threads. However, since this approach effectively serializes the client-side readers of dataset 108, it is not ideal from a performance/efficiency perspective.

Figure 4:
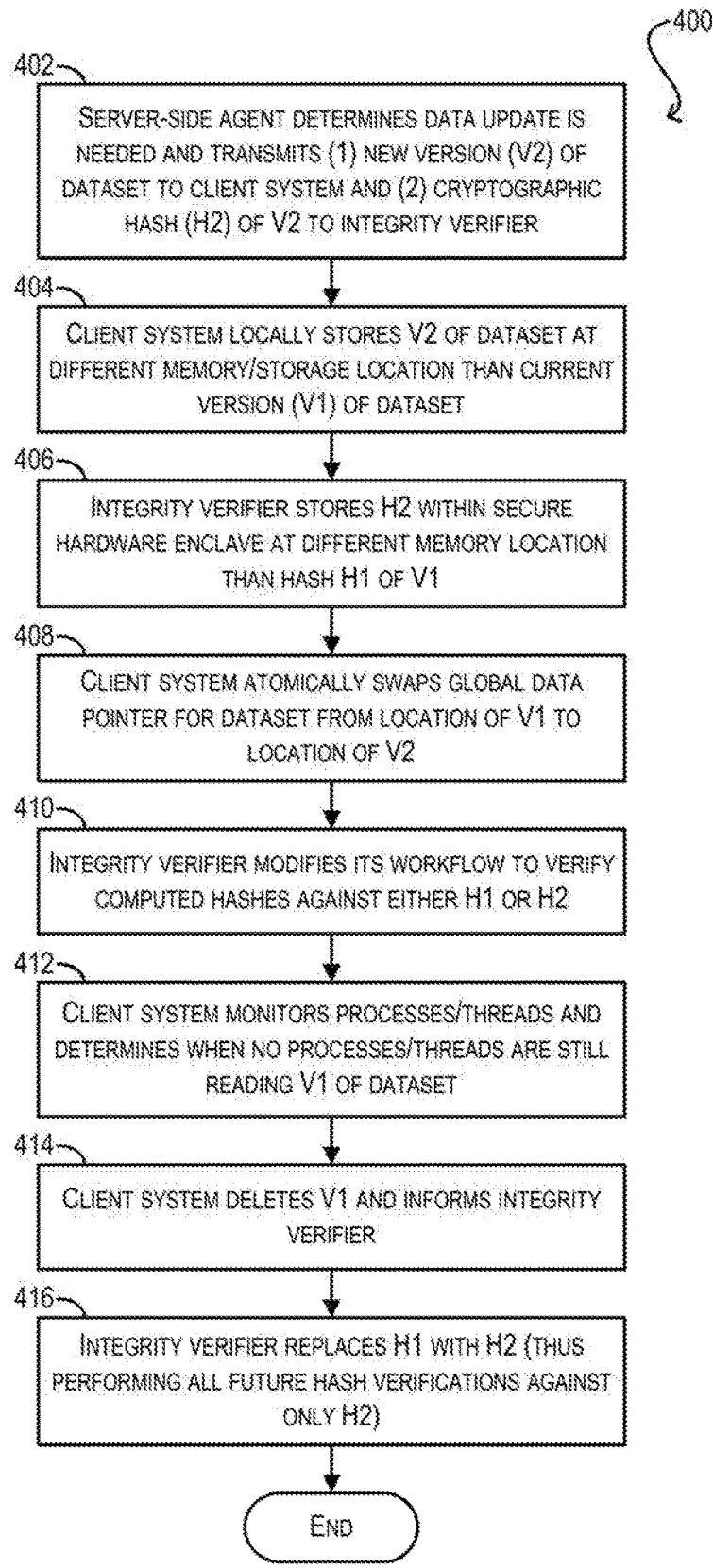
FIG. 4 depicts a workflow for efficiently handling data updates according to an embodiment.

An alternative approach for handling updates to dataset 108 is shown via workflow 400 of FIG. 4. With workflow 400, there is no need to shut down the client-side readers of dataset 108 in order to carry out the update; instead, two versions (i.e., the old and new versions) of dataset 108 are maintained on client system 102 for a short period of time and readers are dynamically switched over to the new version. Workflow 400 assumes that client system 102 maintains a global pointer to dataset 108 (which is used by all readers of the dataset to access the data) and that the global pointer points to the location of the current version (i.e., V1) of the dataset on client system 102.

Starting with block 402, server-side agent 110 can determine that a data update is needed and can transmit (1) a new version (i.e., V2) of dataset 108 to client system 102 and (2) the corresponding cryptographic hash (i.e., H2) for V2 to integrity verifier 112. In response, client system 102 can locally store V2 of dataset 108 at a memory/storage location that is different from the location of the current (i.e., V1) version of dataset 108 (block 404), and similarly integrity verifier 112 can store H2 at a memory location within secure hardware enclave 114 that is different from the location of the current cryptographic hash (i.e., H1) for V1 (block 406).

At block 408, client system 102 can atomically swap the global pointer for dataset 108, such that the global pointer is made to point to the location of V2 rather than the location of V1. This causes all future readers of dataset 108 to access the V2 version. Further, at block 410, integrity verifier 112 can modify its data verification workflow (i.e., workflow 200 of FIG. 2) such that it compares the hashes that it computes against both H1 and H2, with a match to either value resulting in a verification success. This ensures that, regardless of whether integrity verifier 112 reads dataset 108 for its hash computation/verification before or after the global pointer swap at block 408, it will correctly verify the data.

Once client system 102 swaps the global pointer per block 408, it monitors the processes/threads on the system and determines when no processes/threads are reading V1 of dataset 108 (block 412). In one set of embodiments, this determination can be accomplished as follows:

1. Ensure that all processes/threads that access/read dataset 108 do so from within a RCU (read-copy update) read-side critical section
2. After swapping the global pointer at block 408, wait for a grace period to elapse, so that all previous readers of dataset 108 (which might still have pointers to V1 of dataset 108) will have completed their RCU read-side critical sections
3. At this point, there cannot be any readers still holding references to V1

Finally, upon determining that no processes/threads are still reading V1 of dataset 108, client system 102 can delete V1 and inform integrity verifier 112 (block 414), which can replace H1 with H2 (thereby performing all future hash verifications using only H2) (block 416). Workflow 400 can subsequently end.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    creating a secure hardware enclave on a client system, the secure hardware enclave corresponding to a memory region of the client system that cannot be accessed by processes running in other memory regions of the client system and is created via a particular set of one or more central processing unit (CPU) instruction codes;
    loading, by the client system, program code for an integrity verifier into the secure hardware enclave;
    receiving, by the client system, a dataset from a server system and storing the received dataset at a storage or memory location on the client system;
    receiving, by the integrity verifier, a cryptographic hash of the dataset from the server system and storing the received cryptographic hash at a memory location within the secure hardware enclave; and
    on a periodic basis:
    computing, by the integrity verifier, a cryptographic hash of the stored dataset;
    comparing, by the integrity verifier, the computed cryptographic hash against the stored cryptographic hash;
    obtaining, by the integrity verifier, a CPU-generated time stamp counter value;
    providing, by the integrity verifier, the time stamp counter value to the server system; and
    if the computed cryptographic hash does not match the stored cryptographic hash, determining, by the integrity verifier, that the stored dataset has been modified.

2. The method of claim 1 wherein the server system is configured to, prior to providing the dataset to the client system:
    verify that the secure hardware enclave was created using the particular set of one or more CPU instruction codes; and
    verify that a correct version of the program code for the integrity verifier has been loaded into the secure hardware enclave.

3. The method of claim 1 wherein the periodic basis comprises random intervals.

4. The method of claim 1 wherein the storage or memory location where the dataset is stored on the client system is outside of the secure hardware enclave.

5. The method of claim 1 further comprising:
    receiving, by the client system from the server system, a new version of the dataset and storing the new version of the dataset at another storage or memory location on the client system;
    receiving, by the integrity verifier from the server system, a new cryptographic hash for the new version of the dataset and storing the new cryptographic hash at another memory location within the secure hardware enclave;
    atomically swapping, by the client system, a global memory pointer to point to said another storage or memory location; and
    causing, by the client system, the integrity verifier to perform future comparisons of the computed cryptographic hash against either the stored cryptographic hash or the stored new cryptographic hash.

6. The method of claim 5 further comprising:
    determining, by the client system, when there are no processes or threads on the client system still reading the stored dataset; and
    in response to the determining:
    deleting the stored dataset; and
    causing the integrity verifier to perform future comparisons of the computed cryptographic hash solely against the stored new cryptographic hash.

7. A non-transitory computer readable storage medium having stored thereon program code executable by a client system, the program code embodying a method comprising:
    creating a secure hardware enclave on the client system, the secure hardware enclave corresponding to a memory region of the client system that cannot be accessed by processes running in other memory regions of the client system and is created via a particular set of one or more central processing unit (CPU) instruction codes;
loading program code for an integrity verifier into the secure hardware enclave;
receiving a dataset from a server system and storing the received dataset at a storage or memory location on the client system;
receiving, via the integrity verifier, a cryptographic hash of the dataset from the server system and storing the received cryptographic hash at a memory location within the secure hardware enclave; and
on a periodic basis:
computing, via the integrity verifier, a cryptographic hash of the stored dataset;
comparing, via the integrity verifier, the computed cryptographic hash against the stored cryptographic hash;
obtaining, via the integrity verifier, a CPU-generated time stamp counter value;
providing, via the integrity verifier, the time stamp counter value to the server system; and
if the computed cryptographic hash does not match the stored cryptographic hash, determining, via the integrity verifier, that the stored dataset has been modified.

8. The non-transitory computer readable storage medium of claim 7 wherein the server system is configured to, prior to providing the dataset to the client system:
verify that the secure hardware enclave was created using the particular set of one or more CPU instruction codes; and
verify that a correct version of the program code for the integrity verifier has been loaded into the secure hardware enclave.

9. The non-transitory computer readable storage medium of claim 7 wherein the periodic basis comprises random intervals.

10. The non-transitory computer readable storage medium of claim 7 wherein the storage or memory location where the dataset is stored on the client system is outside of the secure hardware enclave.

11. The non-transitory computer readable storage medium of claim 7 wherein the method further comprises:
receiving, from the server system, a new version of the dataset and storing the new version of the dataset at another storage or memory location on the client system;
receiving, via the integrity verifier from the server system, a new cryptographic hash for the new version of the dataset and storing the new cryptographic hash at another memory location within the secure hardware enclave;
atomically swapping a global memory pointer to point to said another storage or memory location; and
causing the integrity verifier to perform future comparisons of the computed cryptographic hash against either the stored cryptographic hash or the stored new cryptographic hash.

12. The non-transitory computer readable storage medium of claim 11 wherein the method further comprises:
determining when there are no processes or threads on the client system still reading the stored dataset; and
in response to the determining:
deleting the stored dataset; and
causing the integrity verifier to perform future comparisons of the computed cryptographic hash solely against the stored new cryptographic hash.

13. A client system comprising:
a processor; and
a non-transitory computer readable medium having stored thereon program code that, when executed, causes the processor to:
create a secure hardware enclave on the client system, the secure hardware enclave corresponding to a memory region of the client system that cannot be accessed by processes running in other memory regions of the client system and is created via a particular set of one or more central processing unit (CPU) instruction codes;
load program code for an integrity verifier into the secure hardware enclave;
receive a dataset from a server system and store the received dataset at a storage or memory location on the client system;
receive, via the integrity verifier, a cryptographic hash of the dataset from the server system and store the received cryptographic hash at a memory location within the secure hardware enclave; and
on a periodic basis:
compute, via the integrity verifier, a cryptographic hash of the stored dataset;
compare, via the integrity verifier, the computed cryptographic hash against the stored cryptographic hash;
obtain, via the integrity verifier, a CPU-generated time stamp counter value;
provide, via the integrity verifier, the time stamp counter value to the server system; and
if the computed cryptographic hash does not match the stored cryptographic hash, determine, via the integrity verifier, that the stored dataset has been modified.

14. The client system of claim 13 wherein the server system is configured to, prior to providing the dataset to the client system:
verify that the secure hardware enclave was created using the particular set of one or more CPU instruction codes; and
verify that a correct version of the program code for the integrity verifier has been loaded into the secure hardware enclave.

15. The client system of claim 13 wherein the periodic basis comprises random intervals.

16. The client system of claim 13 wherein the storage or memory location where the dataset is stored on the client system is outside of the secure hardware enclave.

17. The client system of claim 13 wherein the program code further causes the processor to:
receive, from the server system, a new version of the dataset and store the new version of the dataset at another storage or memory location on the client system;
receive, via the integrity verifier from the server system, a new cryptographic hash for the new version of the dataset and store the new cryptographic hash at another memory location within the secure hardware enclave;
atomically swap a global memory pointer to point to said another storage or memory location; and
cause the integrity verifier to perform future comparisons of the computed cryptographic hash against either the stored cryptographic hash or the stored new cryptographic hash.

18. The client system of claim 17 wherein the program code further causes the processor to:
determine when there are no processes or threads on the client system still reading the stored dataset; and in response to the determining:
delete the stored dataset; and
cause the integrity verifier to perform future comparisons of the computed cryptographic hash solely against the stored new cryptographic hash.

\* \* \* \* \*